(12) United States Patent
Nam et al.

(10) Patent No.: US 7,737,244 B2
(45) Date of Patent: Jun. 15, 2010

(54) PROCESS FOR PREPARING POLYARYLATE

(75) Inventors: Dae-Woo Nam, Daejeon Metropolitan (KR); Dong-Ryul Kim, Daejeon Metropolitan (KR); Hyo-Sun Lee, Daejeon Metropolitan (KR); Boong-Goon Jeong, Daejeon Metropolitan (KR); Sang-Uk Ryu, Daejeon Metropolitan (KR); Hee-Jung Kim, Daejeon Metropolitan (KR); Ju-Eun Cha, Daegu Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/223,591

(22) PCT Filed: Feb. 16, 2007

(86) PCT No.: PCT/KR2007/000839

§ 371 (c)(1),
(2), (4) Date: Aug. 4, 2008

(87) PCT Pub. No.: WO2007/094638

PCT Pub. Date: Aug. 23, 2007

(65) Prior Publication Data

US 2009/0036634 A1 Feb. 5, 2009

(30) Foreign Application Priority Data

Feb. 17, 2006 (KR) ..................... 10-2006-0015561

(51) Int. Cl.
*C08G 63/00* (2006.01)
*C08G 63/02* (2006.01)

(52) U.S. Cl. .................. 528/179; 502/150; 502/208; 528/176; 528/190; 528/192; 528/193

(58) Field of Classification Search ................ 502/150, 502/208; 528/176, 190, 192, 193
See application file for complete search history.

(56) References Cited

U.S. PATENT DOCUMENTS

| 4,612,350 | A | 9/1986 | Parker |
| 2006/0058495 | A1 | 3/2006 | Kim et al. |
| 2007/0123687 | A1* | 5/2007 | Balakrishnan et al. ...... 528/196 |

FOREIGN PATENT DOCUMENTS

| JP | 05-255489 | 10/1993 |
| JP | 09-136946 | 5/1997 |
| JP | 2000-302853 | 10/2000 |

* cited by examiner

*Primary Examiner*—Terressa M Boykin
(74) *Attorney, Agent, or Firm*—McKenna Long & Aldridge LLP

(57) ABSTRACT

The present invention relates to a process for preparing polyarylate, and more specifically, to a process for preparing polyarylate by interfacial polymerization of a bivalent phenol compound and an aromatic dicarboxylic acid or a halide thereof, which comprises mixing a cationic catalyst for the phase transition and a nonionic surfactant in a predetermined ratio, to further increase the yield of polyarylate, as compared with the case of using each of the nonionic surfactant and the cationic catalyst for the phase transition alone.

16 Claims, No Drawings

PROCESS FOR PREPARING POLYARYLATE

This application is the national phase application of International Application Number PCT/KR2007/000839 filed in Feb. 16, 2007, which claims priority benefit of Korean Patent Application No. 10-2006-0015561, filed on Feb. 17, 2006, the entire content of which are fully incorporated herein by reference.

TECHNICAL FIELD

The present invention relates to a process for preparing polyarylate, and more specifically to a process for preparing polyarylate by interfacial polymerization of a bivalent phenol compound and an aromatic dicarboxylic acid or a halide thereof, in order to increase the yield of polyarylate.

BACKGROUND ART

Generally, polyarylate refers to a linear aromatic polyester resin prepared by poly-condensing an aromatic diol and an aromatic dicarboxylic acid. Such the polyarylate resin can have various molecular formulas depending upon its raw materials used. Among others, mention may be typically made of a polyarylate resin comprising the repeating units represented by the following formula 1, which is prepared by reacting bisphenol A as a bivalent phenol, and terephthalic acid or isophthalic acid as a di-carboxylic acid by polycondensation.

[Formula 1]

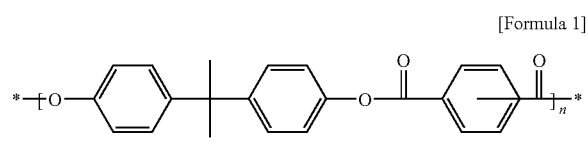

The polyarylate resin of the formula 1 is known in the art as an engineering plastic which is excellent in overall physical properties, and it can be widely used in the field of electric and electronic appliance part, for example, a switch, a socket, parts of a microwave, a relay case, and a plate since it has high heat resistance, excellent mechanical strength, and transparency. Further, in the mechanical field, it can be widely used as various raw materials or packaging materials to prepare various products, such as inner and/or outer parts of watches, parts of optical machines, parts of heating devices including a contact breaker of gas, lenses for a housing or an automobile, overall housing products, and instrument boards.

Examples of the process for preparing polyarylate include interfacial polymerization, solution polymerization and melting polymerization, and among these, the interfacial polymerization is widely used since it advantageously allows easy removal of the by-products and inhibition of an exothermic effect. In the interfacial polymerization for preparing polyarylate, a cationic catalyst for the phase transition can be added to increase a polymerization reaction rate.

DISCLOSURE OF INVENTION

Technical Problem

It is an object of the present invention to provide a process for preparing polyarylate by interfacial polymerization of a bivalent phenol compound and an aromatic dicarboxylic acid or a halide thereof, which comprises a step of mixing a cationic catalyst for the phase transition and a nonionic surfactant in a predetermined ratio, to further increase the yield of polyarylate, as compared with the case of using each of the nonionic surfactant and the cationic catalyst for the phase transition alone.

Technical Solution

The present invention provides a process for preparing polyarylate by interfacial polymerization of a bivalent phenol compound and an aromatic dicarboxylic acid or a halide thereof, which comprises adding a nonionic surfactant and a cationic catalyst for the phase transition to a reactor.

Advantageous Effects

According to the present invention, the process for preparing polyarylate by interfacial polymerization of a bivalent phenol compound and an aromatic dicarboxylic acid or a halide thereof, which comprises mixing a cationic catalyst for the phase transition and a nonionic surfactant in a predetermined ratio, has an effect of increasing the weight of the resultant polymer, based on the total input parts by weight of the nonionic surfactant and the cationic catalyst for the phase transition, as compared with the case of using each of the nonionic surfactant and the cationic catalyst for the phase transition alone.

BEST MODE FOR CARRYING OUT THE INVENTION

The present invention provides a process for preparing polyarylate by interfacial polymerization of a bivalent phenol compound and an aromatic dicarboxylic acid or a halide thereof, which comprises a step of adding a cationic catalyst for the phase transition and a nonionic surfactant to a reactor.

Hereinbelow, the present invention will be described in detail.

In the process for preparing polyarylate according to the present invention, the nonionic surfactant is preferably used in an amount of 1 to 10,000 parts by weight based on 100 parts by weight of the cationic catalyst for the phase transition.

In the process for preparing polyarylate according to the present invention, the amount of the mixed nonionic surfactant and cationic catalyst for the phase transition is preferably 0.0001 to 10 parts by weight, based on 100 parts by weight of the bivalent phenol compound. If the amount of the mixed nonionic surfactant and cationic catalyst for the phase transition is less than 0.0001 part by weight based on 100 parts by weight of the bivalent phenol compound, the polymerization reaction rate may be too low, whereas if the amount is more than 10 parts by weight, the polymerization reaction rate is high, but it is not preferable from the viewpoint of production costs, derived from the use of an expensive catalyst for the phase transition.

In the process for preparing polyarylate according to the present invention, the nonionic surfactant is preferably a nonionic surfactant having an HLB (Hydrophilic Lipophilic Balance) value of 4 to 20.

The HLB denotes a ratio of the lipophilic groups and the hydrophilic groups in the surfactant. The HLB value of the nonionic surfactant can be calculated as follows (see Reference "Surfactants and interfacial phenomena", MILTON J. ROSEN 1989. p. 328).

For a multivalent alcohol ester, the HLB of the nonionic surfactant is calculated according to the following equation 1:

$$HLB = 20\{1 - (S/A)\} \qquad \text{[Equation 1]}$$

wherein A is an acid value of fatty acids, and S is a saponification number in esters.

For an ethylene oxide adduct (of a Tween type) of a multivalent alcohol ester, the HLB of the nonionic surfactant is calculated according to the following equation 2:

HLB=(E+P)/5   [Equation 2]

wherein E is the content (%) of ethylene oxide, and P is the content (%) of the multivalent alcohol.

Furthermore, for the nonionic surfactant comprising an ethylene oxide adduct, the HLB is calculated according to the following equation 3:

HLB=E/5   [Equation 3]

wherein E is the content (%) of ethylene oxide.

Examples of the nonionic surfactant include, but not limited thereto, polyoxyethylene laurylether, polyoxyethylene nonylphenylether, a polyoxyethylene-polyoxypropylene block copolymer, sorbitol anhydride, ethoxylated fatty acid alcohol, ethoxylated fatty acid, ethoxylated alkyl phenol, ethoxylated fatty acid alkanolamide, fatty acid amine oxide, fatty acid amido amine oxide, glyceryl fatty acid ester, sorbitan, polyoxyethylene sorbitan tristearate, ethoxylated sorbitan ester, alkyl polyglycoside, ethylene/propylene oxide block copolymer, and ethoxylated-propoxylated fatty acid alcohol.

In the process for preparing polyarylate according to the present invention, as the cationic catalyst for the phase transition, tertiary amine, quaternary ammonium salt, quaternary arsonium salt, quaternary phosphate, or a tertiary sulfonium salt can be used. Specifically, as the tertiary amine, triethylamine, tri-n-butylamine, dimethylcyclohexylamine, or the like can be used; as the quaternary ammonium salt, tetramethylammonium bromide, tetraethyl ammonium chloride, tetraethyl ammonium bromide, tetra-n-butyl ammonium iodide, trimethylcetyl ammonium bromide, trimethylbenzyl ammonium chloride, triethylbenzyl ammonium chloride, dimethylbenzylphenyl ammonium chloride, dimethylbenzylstearyl ammonium chloride, or the like can be used; as the quaternary arsonium salt, methyltriphenylasonium iodide, benzyltriphenylasonium iodide, benzyltriphenyl arsonium bromide, benzyltriphenyl arsonium chloride, tetraphenyl arsonium chloride, or the like can be used; as the quaternary phosphate, tetrabutyl phosphoric acid iodide, methyltriphenyl phosphoric acid chloride, methyltriphenyl phosphoric acid iodide, hydroxyethyl triphenyl phosphoric acid chloride, benzyltriphenyl phosphoric acid chloride, p-xylene-α,α'-bis (triphenyl phosphoric acid chloride), or the like can be used; as the tertiary sulfonium salt, dimethyl-2-hydroxyphenyl sulfonium chloride, dimethyl-3,5-dihydroxyphenylsulfonium chloride, tribenzyl sulfonium hydrogen sulfate, hexamethylene-1,6-bis(dimethyl-sulfonium bromide), p-xylene-α,α'-bis (dihydroxyethyl sulfonium bromide), or the like can be used; but not limited thereto.

In the process for preparing polyarylate according to the present invention, the bivalent phenol compound is not limited in its kind, but at least one selected from the bivalent phenol compounds represented by the following formula 2 is preferably used.

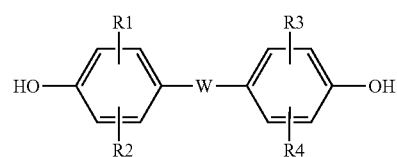

[Formula 2]

wherein R1, R2, R3, and R4 are each independently a hydrogen, a $C_1$ to $C_{12}$ alkyl group, an aryl group, or a halogen group, and W is a $C_1$ to $C_{30}$ alkylidene group, a $C_2$ to $C_{30}$ alkylene group, a $C_3$ to $C_{30}$ cycloalkylidene group, a $C_3$ to $C_{30}$ cycloalkylene group, a $C_2$ to $C_{30}$ alkylene group substituted with phenyl, an oxygen, a sulfur, a sulfoxide group, a sulfone group, or a single bond.

Preferable examples of the bivalent phenol compound represented by the formula 2 include bis(4-hydroxyaryl)alkane such as bis(4-hydroxyphenyl)methane, 2,2-bis(4-hydroxyphenyl)propane, 1,1-bis(4-hydroxyphenyl)ethane, 2,2-bis (4-hydroxy-3-methylphenyl)propane, 2,2-bis(4-hydroxyphenyl)heptane, 2,2-bis(4-hydroxy-3,5-dichlorophenyl) propane, 2,2-bis(4-hydroxy-2,5-dibromophenyl)propane, bis (4-hydroxyphenyl)phenylmethane, 4,4-dihydroxyphenyl-1, 1-m-diisopropylbenzene, and 4,4-dihydroxyphenyl-9,9-fluorene; bis(hydroxyaryl)cycloalkane such as 1,1-bis(4,4-dihydroxyphenyl)cyclopentane, 1,1-bis(4,4-dihydroxyphenyl)cyclohexane, 1-methyl-1-(4-hydroxyphenyl)-4-(dimethyl-4-hydroxyphenyl) methylcyclohexane, 4-{1-[3-(4-hydroxyphenyl)-4-methylcyclohexyl]-1-methylethyl}phenol, 4,4-[1-methyl-4-(1-methylethyl)-1,3-cyclohexanediyl]bisphenol, and 2,2,2, 2-tetrahydro-3,3,3,3-tetramethyl-1,1-spirobis-[1H]-ynedene]-6,6-diol; dihydroxydiarylether such as bis(4-hydroxyphenyl)ether, bis(4-hydroxy-3,5-dichlorophenyl) ether, and 4,4-dihydroxy-3,3-dimethylphenylether; dihydroxydiarylsulfide such as 4,4-dihydroxydiphenylsulfide and 4,4-dihydroxy-3,3-dimethyldiphenylsulfide; dihydroxydiarylsulfoxide such as 4,4-dihydroxydiphenylsulfoxide and 4,4-dihydroxy-3,3-dimethyldiphenylsulfoxide; dihydroxydiarylsulfone such as 4,4-dihydroxydiphenylsulfone and 4,4-dihydroxy-3,3-dimethyldiphenylsulfone; dihydroxydiarylisatine such as 4,4-dihydroxydiphenyl-3,3-isatine; dihydroxybenzene such as resocine, 3-methylresocine, 3-ethylresocine, 3-butylresocine, 3-t-butylresocine, 3-phenylresocine, and 3-cumylresocine; dihydroxydiphenyl such as 4,4'-dihydroxydiphenyl and 3,3'-dichloro-4,4'-dihydroxydiphenyl; and a mixture of two or more thereof.

In the process for preparing polyarylate according to the present invention, examples of the aromatic dicarboxylic acid or a halide thereof include, but not limited thereto, terephthalic acid, isophthalic acid, dibenzo acid, naphthalene dicarboxylic acid, bis(4-carboxyphenyl)methane, 1,2-bis(4-carboxyphenyl)ethane, 2,2-bis(4-carboxyphenyl)propane, bis (4-carboxyphenyl)oxide, bis(4-carboxyphenyl)sulfide, bis (4-carboxyphenyl)sulfone, and other aromatic dicarboxylic acids substituted for the aromatic group of above compounds by a $C_1$ to $C_2$ alkyl or halogen group, and a mixture of two or more thereof.

Preferably, the aromatic carboxylic acid or the halide thereof may be a mixture of 10 to 90 mol % of terephthalic acid halide and 90 to 10 mol % of isophthalic acid halide.

In the process for preparing polyarylate according to the present invention, upon interfacial polymerization of the bivalent phenol compound and the halide of the aromatic dicarboxylic acid, a molecular weight modifier for modifying the molecular weight of the polymer, a reaction terminator, an alkali, an organic solvent, or the like can be used.

Examples of the molecular weight modifier include, but not limited thereto, a monovalent hydroxy compound, for example, a monovalent phenol compound such as phenol, o-, m-, p-cresol, o-, m-, p-ethyl phenol, o-, m-, p-propyl phenol, and o-, m-, p-tert-butyl phenol; or a monohydric alcohol compound selected from the group consisting of methanol, ethanol, n-propanol, isopropanol, n-butanol, pentanol, hexanol, dodecyl alcohol, stearyl alcohol, benzyl alcohol, and penethyl alcohol; and a monovalent (aromatic) carboxylic acid halide, for example, benzyl chloride, methane sulfonyl chloride, and phenylchloroformate; and acetic acid, propionic acid, octanoic acid, cyclohexane carboxylic acid, benzoic acid, toluoyl acid, phenylic acid, p-tert-butylbenzoic acid, and p-methoxyphenyl acetic acid.

The alkali can be at least one hydroxide of alkali metal selected from sodium hydroxide and potassium hydroxide, and preferably, the alkali is used in 1.01 to 2 fold moles of phenolic hydroxides contained in the bivalent phenol and the molecular weight modifier. If the usage is less than 1.01 fold, the bivalent phenol compound cannot be completely dissolved, whereas if the usage is more than 2 fold, the phase separation becomes worse or the resulting polymer may leave the alkali compounds behind even after purifying polymer products, and thus polyarylate excellent in the transparency cannot be obtained. Furthermore, in the present invention, the alkali is preferably used in an amount of 1.01 to 2 fold moles of phenolic hydroxides, since the aromatic dicarboxylic acid halide is hydrolyzed during the polymerization.

Preferably, the organic solvent can be preferably a solvent that can dissolve polyarylate while water-immiscible, and examples thereof include methylene chloride, 1,2-dichloroethane, chloroform, carbon tetrachloride, chlorobenzene and 1,1,2,2-tetrachloroethane; and a mixture of two or more kinds thereof.

In the process for preparing polyarylate according to the present invention, upon interfacial polymerization of the bivalent phenol compound and the aromatic dicarboxylic acid or a halide thereof, it is advantageous that the polymerization temperature is 0 to 40° C. and more preferably at 0 to 30° C., since the hydrolysis of acid chloride is suppressed.

In the procedure described above, after finishing the polymerization of the bivalent phenol compound and the aromatic dicarboxylic acid or a halide thereof, after stirring, the reactants are repeatedly washed with distilled water, and the by-products are removed off. Then, the resultant is separated out using an anti-solvent such as methanol, ethanol and acetone, and then dried to obtain solid polyarylate.

Generally, the nonionic surfactant is in the state of a paste, and since the cationic catalyst for the phase transition is solid, a mixture of the nonionic surfactant and the cationic catalyst for the phase transition can be dissolved in a solvent for easy solubility, and then introduced to reaction upon the polymerization reaction.

In the process for preparing polyarylate according to the present invention, the point of time for adding the nonionic surfactant and the cationic catalyst for the phase transition to a reactor can vary depending on the process for introducing, as the monomers, the divalent phenol, or aromatic dicarboxylic acid or a halide thereof.

According to one specific Example, if the divalent phenol is dissolved in alkali in a reactor, and then an aromatic dicarboxylic acid or a halide thereof is introduced thereto, the nonionic surfactant and the cationic catalyst for the phase transition are preferably simultaneously added in a mixture to a reactor in which divalent phenol is dissolved in alkali. If the mixture of the nonionic surfactant and the cationic catalyst for the phase transition is introduced to a solution of the aromatic dicarboxylic acid or a halide thereof, the reaction rate may be relatively low until the solution of the aromatic dicarboxylic acid or a halide thereof is completely introduced.

Moreover, according to one specific Example, if the aromatic dicarboxylic acid or a halide thereof is dissolved in an organic solvent in a reactor, and a solution having the divalent phenol dissolved in alkali is introduced thereto, the nonionic surfactant and the cationic catalyst for the phase transition are preferably simultaneously added in a mixture to a reactor in which dicarboxylic acid or a halide thereof is dissolved in an organic solvent. If the mixture of the nonionic surfactant and the cationic catalyst for the phase transition is introduced to a solution having the divalent phenol dissolved in alkali, the reaction rate may be relatively low until the solution of the divalent phenol is completely introduced.

Hereinafter, the present invention will be described in detail with reference to Examples. As such, it should not be construed that the scope of the invention is limited to Examples.

MODE FOR THE INVENTION

Example 1

44.96 g of 2,2-bis(4-hydroxyphenyl)propane (BPA), 393.8 g of distilled water, and 16.41 g of NaOH were added to a reactor equipped with a stirrer and then the monomers were dissolved. Then, after the internal temperature of the reactor was set up at 20° C., 0.0409 g of EMULGEN 120® (polyoxyethylene lauryl ether, HLB: 15.3) and 0.0041 g of BTEAC (benzyltriethylammonium chloride) were mixed such that the weigh ratio of the 'EMULGEN 120®/BTEAC' be 10/1, and the mixture was dissolved in 32.5 g of methylene chloride, and then stirred. Separately, 40.04 g of an aromatic dicarboxylic acid mixture of isophthalic acid and terephthalic acid in the same molar amounts was dissolved in 505.98 g of methylene chloride. The resulting solution was added to the reactor under stirring in which the aqueous alkaline solution had previously been dissolved. After proceeding the polymerization for 1 hour, the reaction was stopped by adding acetic acid, and then the resultant was repeatedly washed out several times by using one-fold volume of methylene chloride and two-fold volume of distilled water. Thus washed solution was poured to methanol to separate the polymers out, and subsequently the polymers were filtered out, and then dried in a vacuum oven at 120° C. for 12 hours.

Examples 2 to 4

While the weight ratios of 'EMULGEN 120®/BTEAC' were changed as shown in the following Table 1, the same test procedure was carried out in the same manner as in Example 1, and the total amount of the surfactant introduced to reaction was constantly maintained at 0.1 g/100 g BPA.

TABLE 1

| | Total amount of (A + B) (based on 100 parts by weight of C) | A/B (weight ratio) |
|---|---|---|
| Example 1 | 0.1 | 10/1 |
| Example 2 | 0.1 | 5/1 |

TABLE 1-continued

| | Total amount of (A + B) (based on 100 parts by weight of C) | A/B (weight ratio) |
|---|---|---|
| Example 3 | 0.1 | 1/1 |
| Example 4 | 0.1 | 1/2 |

A: Nonionic surfactant,
B: Cationic catalyst for the phase transition, and
C: Bivalent phenol compound.

Comparative Example 1

42.3 g of 2,2-bis(4-hydroxyphenyl)propane (BPA), 395.6 g of distilled water, and 16.5 g of NaOH were added to a reactor equipped with a stirrer and then the monomers were dissolved. Then, after the internal temperature of the reactor was set up at 20° C., 0.254 g of BTEAC (benzyltriethylammonium chloride) was dissolved in 32.5 g of methylene chloride, and then stirred. At this time, the weight ratio of BTEAC introduced based on 100 g of BPA was 0.6 g BTEAC/100 g BPA. Separately, 37.68 g of an aromatic dicarboxylic acid mixture of isophthalic acid and terephthalic acid in the same molar amounts was dissolved in 508 g of methylene chloride. The resulting solution was added to the reactor under stirring in which the aqueous alkaline solution had previously been dissolved. After proceeding the polymerization for 1 hour, the reaction was stopped by adding acetic acid, and then the resultant was repeatedly washed out several times by using one-fold volume of methylene chloride and two-fold volume of distilled water. Thus washed solution was poured to methanol to separate the polymers out, and subsequently the polymers were filtered out, and then dried in a vacuum oven at 120° C. for 12 hours.

Comparative Example 2

44.96 g of 2,2-bis(4-hydroxyphenyl)propane (BPA), 393.8 g of distilled water, and 16.41 g of NaOH were added to a reactor equipped with a stirrer, and then the monomers were dissolved. Then, after the internal temperature of the reactor was set up at 20° C., 0.157 g of EMULGEN 120® was dissolved in 32.5 g of methylene chloride, and then stirred. At this time, the weight ratio of EMULGEN 120® introduced based on 100 g of BPA was 0.35 g EMULGEN 120®/100 g BPA. Separately, 40.04 g of an aromatic dicarboxylic acid mixture of isophthalic acid and terephthalic acid in the same molar amounts was dissolved in 506.98 g of methylene chloride. The resulting solution was added to the reactor under stirring in which the aqueous alkaline solution had previously been dissolved. After proceeding the polymerization for 1 hour, the reaction was stopped by adding acetic acid, and then the resultant was repeatedly washed out several times by using one-fold volume of methylene chloride and two-fold volume of distilled water. Thus washed solution was poured to methanol to separate the polymers out, and subsequently the polymers were filtered out, and then dried in a vacuum oven at 120° C. for 12 hours.

<Measurement Method for Results of Experiment>

1) Molecular weight (Mw) of the resultant polymer

The molecular weight of the resultant polymer was measured with polystyrene as a standard material, and THF (tetrahydrofuran) as solvent.

2) Weight of the Resultant Polymer

In Examples (1 to 4), the mixture of the nonionic surfactant and the cationic catalyst for the phase transition was precipitated, and then dried to obtain polymers. The weight of thus obtained polymer was measured, as compared with the weight of the mixture. Further, in Comparative Examples (1 to 2), the nonionic surfactant or the cationic catalyst for the phase transition was precipitated, and then dried to obtain polymers. The weight of thus obtained polymer was measured, as compared with the weight of the nonionic surfactant or the cationic catalyst for the phase transition.

TABLE 2

| | Molecular weight ($M_w$) of the resultant polymer | Weight of the resultant polymer |
|---|---|---|
| Example 1 | 134,000 | 1610.1 |
| Example 2 | 148,000 | 1591.1 |
| Example 3 | 100,000 | 1620.9 |
| Example 4 | 81,000 | 1630.1 |
| Comparative Example 1 | 100,000 | 275.65 |
| Comparative Example 1 | 110,000 | 465.19 |

A: Nonionic surfactant, and
B: Cationic catalyst for the phase transition.

The invention claimed is:

1. A process for preparing polyarylate by interfacial polymerization of a bivalent phenol compound and an aromatic dicarboxylic acid or a halide thereof, which comprises a step of adding a cationic catalyst for the phase transition and a nonionic surfactant to a reactor,
   wherein the cationic catalyst for the phase transition is at least one selected from the group consisting of tertiary amine, quaternary ammonium salt, quaternary arsonium salt, quaternary phosphate, and tertiary sulfonium salt,
   the nonionic surfactant has an HLB (Hydrophilic Lipophilic Balance) value of 4 to 20,
   the nonionic surfactant is added in an amount of 1 to 10,000 parts by weight, based on 100 parts by weight of the cationic catalyst for the phase transition, and
   the total weight of the mixed nonionic surfactant and cationic catalyst for the phase transition is 0.0001 to 10 parts by weight, based on 100 parts by weight of the bivalent phenol compound.

2. The process for preparing polyarylate according to claim 1, wherein the nonionic surfactant is at least one selected from the group consisting of polyoxyethylene laurylether, polyoxyethylene nonylphenylether, polyoxyethylene-polyoxypropylene block copolymer, sorbitol anhydride, ethoxylated fatty acid alcohol, ethoxylated fatty acid, ethoxylated alkyl phenol, ethoxylated fatty acid alkanolamide, fatty acid amine oxide, fatty acid amido amine oxide, glyceryl fatty acid ester, sorbitan, polyoxyethylene sorbitan tristearate, ethoxylated sorbitan ester, alkyl polyglycoside, ethylene/propylene oxide block copolymer, and ethoxylated-propoxylated fatty acid alcohol.

3. The process for preparing polyarylate according to claim 1, wherein the tertiary amine is selected from the group consisting of triethylamine, tri-n-butylamine, and dimethylcyclohexyl amine.

4. The process for preparing polyarylate according to claim 1, wherein the quaternary ammonium salt is selected from the group consisting of tetramethylammonium bromide, tetraethyl ammonium chloride, tetraethyl ammonium bromide, tetra-n-butyl ammonium iodide, trimethylcetyl ammonium bromide, trimethylbenzyl ammonium chloride, triethylbenzyl ammonium chloride, dimethylbenzylphenyl ammonium chloride, and dimethylbenzylstearyl ammonium chloride.

5. The process for preparing polyarylate according to claim 1, wherein the quaternary arsonium salt is selected from the group consisting of methyltriphenylasonium iodide, benzyltriphenylasonium iodide, benzyltriphenyl arsonium bromide, benzyltriphenyl arsonium chloride, and tetraphenyl arsonium chloride.

6. The process for preparing polyarylate according to claim 1, wherein the quaternary phosphate is selected from the group consisting of tetrabutyl phosphoric acid iodide, methyltriphenyl phosphoric acid chloride, methyltriphenyl phosphoric acid iodide, hydroxyethyl triphenyl phosphoric acid chloride, benzyltriphenyl phosphoric acid chloride, and p-xylene-α,α'-bis(triphenyl phosphoric acid chloride).

7. The process for preparing polyarylate according to claim 1, wherein the tertiary sulfonium salt is selected from the group consisting of dimethyl-2-hydroxyphenyl sulfonium chloride, dimethyl-3,5-dihydroxyphenylsulfonium chloride, tribenzyl sulfonium hydrogen sulfate, hexamethylene-1,6-bis (dimethyl-sulfonium bromide), and p-xylene-α,α'-bis(dihydroxyethyl sulfonium bromide).

8. The process for preparing polyarylate according to claim 1, wherein the bivalent phenol compound is at least one selected from the group consisting of the compounds represented by the following formula 2:

[Formula 2]

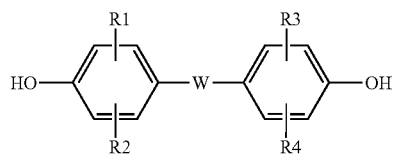

wherein R1, R2, R3, and R4 are each independently a hydrogen, a $C_1$ to $C_{12}$ alkyl group, an aryl group, or a halogen, and W is a $C_1$ to $C_{30}$ alkylidene group, a $C_2$ to $C_{30}$ alkylene group, a $C_3$ to $C_{30}$ cycloalkylidene group, a $C_3$ to $C_{30}$ cycloalkylene group, a $C_2$ to $C_{30}$ alkylene group substituted with phenyl, an oxygen, a sulfur, a sulfoxide group, a sulfone group, or a single bond.

9. The process for preparing polyarylate according to claim 1, wherein the bivalent phenol compound is selected from the group consisting of bis(4-hydroxyphenyl)methane, 2,2-bis (4-hydroxyphenyl)propane, 1,1-bis(4-hydroxyphenyl) ethane, 2,2-bis(4-hydroxy-3-methylphenyl)propane, 2,2-bis (4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl) phenylmethane, 4,4-dihydroxyphenyl-1,1-m-diisopropylbenzene, 4,4-dihydroxyphenyl-9,9-fluorene, 1,1-bis(4,4-dihydroxyphenyl)cyclopentane, 1,1-bis(4,4-dihydroxyphenyl)cyclohexane, 1-methyl-1-(4-hydroxyphenyl)-4-(dimethyl-4-hydroxyphenyl) methylcyclohexan-e4-{1-[3-(4-hydroxyphenyl)-4-methylcyclohexyl]-1-methylethyl}phenol, 4,4-[1-methyl-4-(1-methylethyl)-1,3-cyclohexanediyl]bisphenol, 2,2,2,2-tetrahydro-3,3,3,3-tetramethyl-1,1-spirobis-[1H]-ynedene]-6,6-dio- 1, bis(4-hydroxyphenyl)ether, bis(4-hydroxy-3,5-dichlorophenyl)ether, 4,4-dihydroxy-3,3-dimethylphenylether, 4,4-dihydroxydiphenylsulfide, 4,4-dihydroxy-3,3-dimethyldiphenylsulfide, 4,4-dihydroxydiphenylsulfoxide, 4,4-dihydroxy-3,3-dimethyldiphenylsulfoxide, 4,4-dihydroxydiphenylsulfone, 4,4-dihydroxy-3,3-dimethyldiphenylsulfone, 4,4-dihydroxydiphenyl-3,3-isatine, resocine, 3-methylresocine, 3-ethylresocine, 3-butylresocine, 3-t-butylresocine, 3-phenylresocine, 3-cumylresocine, 4,4'-dihydroxydiphenyl, and 3,3'-dichloro-4,4'-dihydroxydiphenyl.

10. The process for preparing polyarylate according to claim 1, wherein the aromatic dicarboxylic acid or a halide thereof is at least one selected from the group consisting of terephthalic acid, isophthalic acid, dibenzo acid, naphthalene dicarboxylic acid, bis(4-carboxyphenyl)methane, 1,2-bis(4-carboxyphenyl)ethane, 2,2-bis(4-carboxyphenyl)propane, bis(4-carboxyphenyl)oxide, bis(4-carboxyphenyl)sulfide, bis(4-carboxyphenyl)sulfone, and aromatic dicarboxylic acids substituted for the aromatic group of above compounds by a C.sub.1 to C.sub.2 alkyl or halogen group.

11. The process for preparing polyarylate according to claim 1, wherein upon interfacial polymerization of the bivalent phenol compound, and the aromatic dicarboxylic acid or a halide thereof, at least one selected from a molecular weight modifier, a reaction terminator, an alkali, and an organic solvent is used.

12. The process for preparing polyarylate according to claim 11, wherein the molecular weight modifier is at least one selected from the group consisting of a monovalent phenol compound, such as phenol, o-, m-, p-cresol, o-, m-, p-ethyl phenol, o-, m-, p-propyl phenol and o-, m-, p-tert-butyl phenol; a monohydric alcohol compound selected from the group consisting of methanol, ethanol, n-propanol, isopropanol, n-butanol, pentanol, hexanol, dodecyl alcohol, stearyl alcohol, benzyl alcohol and penethyl alcohol; benzyl chloride, methane sulfonyl chloride and phenylchloroformate; and acetic acid, propionic acid, octanoic acid, cyclohexane carboxylic acid, benzoic acid, toluoyl acid, phenylic acid, p-tert-butylbenzoic acid, and p- methoxyphenyl acetic acid.

13. The process for preparing polyarylate according to claim 11, wherein the alkali is hydroxide of an alkali metal.

14. The process for preparing polyarylate according to claim 11, wherein the alkali is used in an amount of 1.01 to 2 fold moles of phenolic hydroxides contained in the bivalent phenol and the molecular weight modifier.

15. The process for preparing polyarylate according to claim 11, wherein the organic solvent is selected from the group consisting of methylene chloride, 1,2-dichloroethane, chloroform, carbon tetrachloride, chlorobenzene, 1,1,2,2-tetrachloroethane, and mixture thereof.

16. The process for preparing polyarylate according to claim 1, wherein upon interfacial polymerization of the bivalent phenol compound and a halide of the aromatic dicarboxylic acid, the polymerization temperature is 0 to 40° C.

* * * * *